US011616739B2

(12) United States Patent
Lee et al.

(10) Patent No.: US 11,616,739 B2
(45) Date of Patent: Mar. 28, 2023

(54) INTELLIGENT MESSAGE PROCESSING SYSTEM

(71) Applicant: MindwareWorks Co., Ltd., Seoul (KR)

(72) Inventors: Jae In Lee, Goyang-si (KR); Hyun Sun Cho, Seoul (KR)

(73) Assignee: MindwareWorks Co., Ltd., Seoul (KR)

( * ) Notice: Subject to any disclaimer, the term of this patent is extended or adjusted under 35 U.S.C. 154(b) by 483 days.

(21) Appl. No.: 16/634,886

(22) PCT Filed: Jul. 4, 2018

(86) PCT No.: PCT/KR2018/007586
§ 371 (c)(1),
(2) Date: Jan. 29, 2020

(87) PCT Pub. No.: WO2019/039725
PCT Pub. Date: Feb. 28, 2019

(65) Prior Publication Data
US 2021/0367909 A1    Nov. 25, 2021

(30) Foreign Application Priority Data
Aug. 21, 2017   (KR) .......................... 10-2017-0105293

(51) Int. Cl.
*G06Q 10/00*        (2023.01)
*H04L 51/02*        (2022.01)
(Continued)

(52) U.S. Cl.
CPC .............. *H04L 51/02* (2013.01); *G06F 9/543* (2013.01); *G06F 9/546* (2013.01); *G06Q 30/016* (2013.01); *H04L 67/56* (2022.05)

(58) Field of Classification Search
CPC ......... H04L 51/02; H04L 67/56; G06F 9/543; G06F 9/546; G06Q 30/016
(Continued)

(56) References Cited

U.S. PATENT DOCUMENTS 7,606,866 B2 * 10/2009 Mora .................... H04L 69/329
709/224
10,332,505 B2 * 6/2019 Zoller .................... G06N 20/00
(Continued)

FOREIGN PATENT DOCUMENTS

| KR | 10-1083468 B1 | 11/2011 |
|----|---------------|---------|
| KR | 10-1594500 B1 | 2/2016  |

(Continued)

OTHER PUBLICATIONS

International Search Report for PCT/KR2018/007586 dated Oct. 10, 2018 from Korean Intellectual Property Office.

*Primary Examiner* — Imad Hussain
(74) *Attorney, Agent, or Firm* — Revolution IP, PLLC

(57) ABSTRACT

An intelligent message processing system includes: a service provider server configured to generate and send a message related to a customer service; a user terminal configured to receive a beginning message from the service provider server, make the beginning message pop up based on user situation information, and perform automatic dialogue through an interactive application program interface (API) when a message is received from an intelligent proxy server after the user selects the beginning message; and an intelligent proxy server configured to act as a proxy for processing the message related to the customer service instead of the service provider server through the interactive API by communicating with the user terminal, receive an additional/following-up service message about the user from the service provider server, and perform automatic dialogue with the user terminal through the interactive API based on the (Continued)

additional/following-up service message when the user selects the beginning message.

1 Claim, 4 Drawing Sheets

(51) Int. Cl.
    *G06F 9/54*     (2006.01)
    *G06Q 30/016*     (2023.01)
    *H04L 67/56*     (2022.01)

(58) Field of Classification Search
    USPC .......................................... 705/304; 709/206
    See application file for complete search history.

(56) References Cited

U.S. PATENT DOCUMENTS

| | | | |
|---|---|---|---|
| 11,089,125 B2* | 8/2021 | Lewallen, Jr. | H04L 67/55 |
| 2009/0299934 A1* | 12/2009 | Horvitz | H04W 4/02 709/224 |
| 2015/0121216 A1* | 4/2015 | Brown | G06N 3/008 715/705 |
| 2016/0034995 A1* | 2/2016 | Williams | G06Q 30/0631 705/26.43 |
| 2016/0247213 A1 | 8/2016 | Lee et al. | |
| 2016/0285790 A1 | 9/2016 | Szeto et al. | |
| 2016/0371702 A1 | 12/2016 | Kim et al. | |
| 2017/0098269 A1 | 4/2017 | Kim | |
| 2017/0277993 A1* | 9/2017 | Beaver | G06Q 30/0201 |
| 2018/0107930 A1* | 4/2018 | Aggarwal | G06N 5/02 |
| 2018/0248817 A1* | 8/2018 | Licht | H04L 51/04 |
| 2018/0261203 A1* | 9/2018 | Zoller | G10L 13/00 |
| 2020/0073999 A1* | 3/2020 | Zucker | G10L 15/22 |
| 2021/0225378 A1* | 7/2021 | Montemurro | G10L 15/22 |

FOREIGN PATENT DOCUMENTS

| | | |
|---|---|---|
| KR | 10-2016-0074954 A | 6/2016 |
| KR | 10-1634427 B1 | 7/2016 |
| KR | 10-2016-0113568 A | 9/2016 |

\* cited by examiner

INTELLIGENT MESSAGE PROCESSING SYSTEM

TECHNICAL FIELD

The disclosure relates to an intelligent message processing system, and more particularly to an intelligent message processing system, in which a user does not need to take follow-up measures related to provision of service in person every time in terms of sending and receiving messages related to customer services between various service providers and many customers (users), the messages related to the customer services are more likely to arrive and be checked, and convenience for the users and the service providers is improved.

BACKGROUND ART

Kakao Talk or the like messenger can directly reply to a push through an answer function when receiving the push. However, a reminder talk, an event/advertisement push, or a push from a bank/credit card company is increasingly ignored in Kakao Talk because it includes not a few one-time and promotional messages.

The reason is because an advertising/informational push message causes inconvenience of downloading the push message and calling a matching application to check the corresponding push, or requiring log-in including an authentication process in a case of a financial application. Therefore, the push message is much less likely to arrive at a customer or user and be checked by the customer or user.

Likewise, the arrival rate of the push message is gradually lowered in order of a postal matter→ an e-mail→ a text message, and thus there is a need of increasing the arrival and checking efficiencies of the push message and enhancing convenience for users.

For example, if a push message for reservation confirmation arrives from a restaurant/beauty shop, where the reservation has been made, on the morning of the reservation date, an informational message such as "Don't forget you have the restaurant reservation today at 6 PM" arrives conventionally. However, when a person for whom the reservation is made needs to inquire about an additional and follow-up procedure, s/he has no choice but to take a measure by making a visit or a separate call in person.

Accordingly, the push message has to be given in the form of a message "Do you remember the restaurant reservation today at 6 PM? Let us know if you want to cancel the reservation or change the time, or need anything further," and a follow-up or additional action needs to automatically proceed in the form of the message.

Meanwhile, a message related to provision of service can be automatically carried out between a customer or user and various service providers, and, in this regard, Korean Patent Publication No. 10-2016-0074954 (hereinafter, referred to as the "related art") discloses an artificial intelligent dialogue system that collects state variables such as a user's moods or situations and provides advice based on the collected information through inference of a professional system technique.

However, the related art is only to intelligently provide the advice, but not correspond to an intelligent dialogue system for performing the customer service to subsequently or additionally proceed after a user or customer applies for various services.

Further, the related art does not take a user's various situations, backgrounds, etc. into account to automatically perform an intelligent dialogue, and a lot of service providers, and cannot intelligently send and receive a message related to the customer service to and from the corresponding user because one proxy acts as each service provider by integrating a lot of service providers.

DISCLOSURE

Technical Problem

The disclosure is conceived to solve the problems of the related art as described above, and an aspect of the disclosure is to provide an intelligent message processing system, which generates an optimum message instead of a user based on the user's situation and background information and immediately performs automatic dialogue through an interactive application program interface (API) in terms of sending and receiving messages related to customer services between various service providers and many customers (users) so that a user does not need to take follow-up measures related to provision of service in person every time, and allows an intelligent proxy server to automatically send and receive the integrated messages related to the customer services to and from a user terminal instead of various service providers through a specific messenger API provided by the service provider or a specific open API support messenger preferred by the user so that the messages related to the customer services are more likely to arrive and be checked and convenience for the users and the service providers is improved.

Technical Solution

To achieve the foregoing technical aspects as described above, the disclosure proposes an intelligent message processing system including: a service provider server configured to generate and send a message related to a customer service; a user terminal configured to receive a beginning message from the service provider server, make the beginning message pop up based on user situation information, and perform automatic dialogue through an interactive application program interface (API) based on a user's selection or the user situation information and user background information when a message is received from an intelligent proxy server after the user selects the beginning message; and an intelligent proxy server configured to act as a proxy for processing the message related to the customer service instead of the service provider server through the interactive API by communicating with the user terminal, receive an additional/following-up service message about the user from the service provider server, and perform automatic dialogue with the user terminal through the interactive API based on the additional/following-up service message when the user selects the beginning message.

Here, the user terminal is characterized in including a user situation information collection unit configured to collect user situation information that includes user setting information previously set by a user and sensing information obtained through sensors, a user background information collection unit configures to collect user background information that includes message information generated during communication with the intelligent proxy server and service-related information generated during communication with the service provider server, and a user agent configured to analyze the user situation information, make the beginning message pop up only when the user is in a condition to check a message, execute the interactive API when the user selects the beginning message, and generate a user response message with regard to a message received from the intelligent proxy server by analyzing the selection of the user or the user situation information and the user background information.

Here, the intelligent proxy server is characterized in generating an additional/following-up service message associated with the user response message as a server response message among the additional/following-up service messages when the user response message is received.

Further, the interactive API is characterized in including a messenger API provided by a service provider or an open-type API support messenger.

Advantageous Effects

With the foregoing problems and solutions, the intelligent message processing system according to the disclosure takes a user's situation into account to send and receive a message in terms of sending and receiving messages related to customer services between various service providers and many customers (users), and generates an optimum message instead of a user based on the user's situation and background information to immediately performs automatic dialogue through an interactive API, so that a user does not need to take follow-up measures related to provision of service in person every time, the messages related to the customer services are more likely to arrive and be checked, and convenience for the users is improved.

Further, according to the disclosure, in terms of sending and receiving messages related to customer services between various service providers and many customers (users), an intelligent proxy server is configured to automatically send and receive the integrated messages related to the customer services to and from a user terminal instead of various service providers through a specific messenger API provided by the service provider or a specific open API support messenger preferred by the user so that the messages related to the customer services are more likely to arrive and be checked and convenience for the users and the service providers is improved.

BEST MODE

Below, preferred embodiments of an intelligent message processing system according to an embodiment of the disclosure with the foregoing objects, solutions, and effects will be described in detail with reference to the accompanying drawings.

Figure 1:
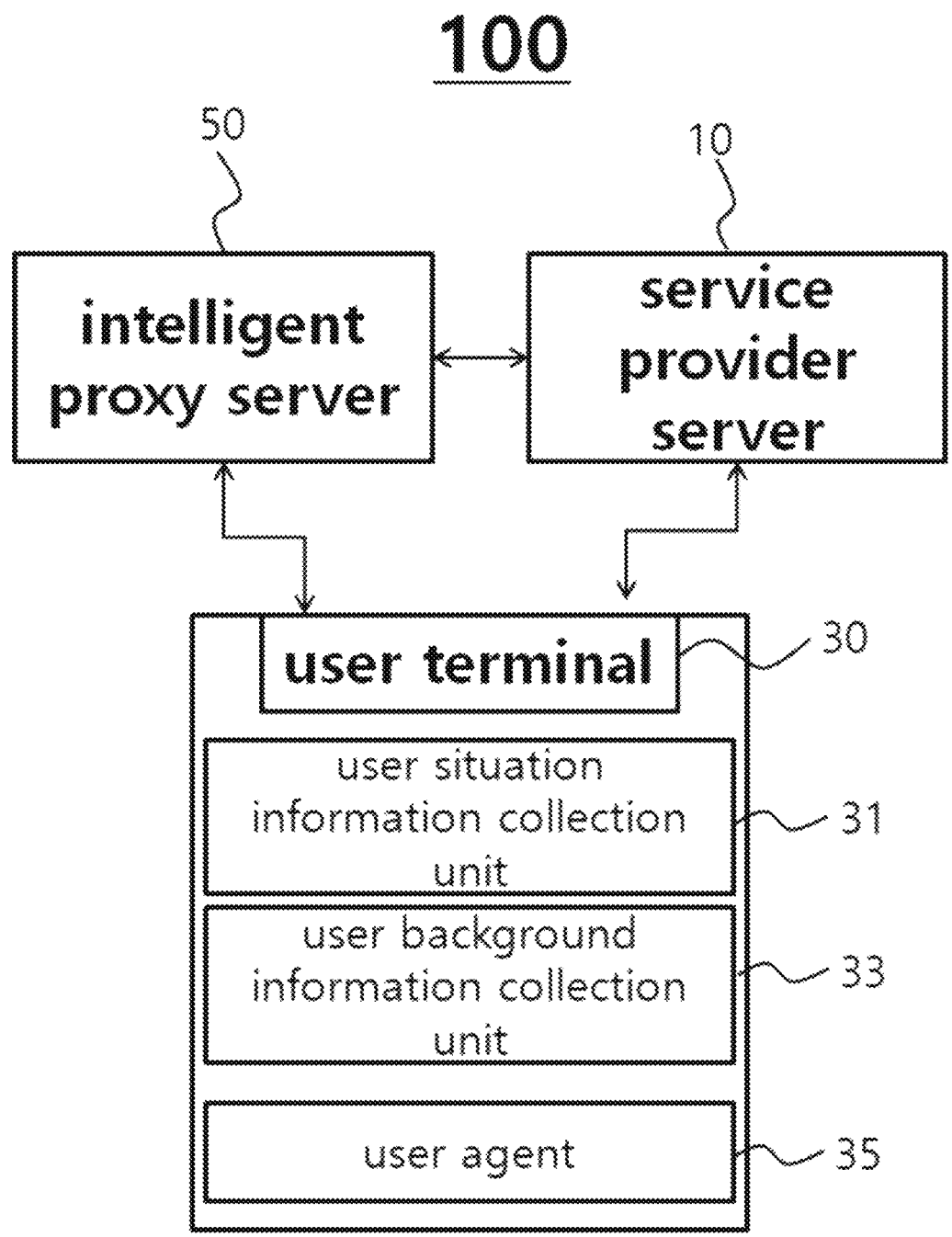
FIG. 1 is a block diagram of an intelligent message processing system according to an embodiment of the disclosure.

FIG. 1 is a block diagram of an intelligent message processing system according to an embodiment of the disclosure.

As shown in FIG. 1, an intelligent message processing system 100 according to an embodiment of the disclosure includes a service provider server 10 operated by a service provider that provides various services to a customer or user, a user terminal 30 used by a customer or user who applies for various services to the service provider or receives various following-up/additional services, and an intelligent proxy server 50 that instead of the service provider intelligently automatically processes the messages related to various customer services for the users The service provider server 10 corresponds to a server which is operated by a service provider that provides various customer services, such as a bank, a credit card company or the like financial service provider, a service provider related to merchandise including a shopping mall, a service provider related to various sales of food, etc. When a customer or user applies for various services or applies for a purchase, a reservation or the like service to the service provider 10, the service provider server 10 serves to inform or guide the customer or user of or through matters related to a customer service by using a message.

Specifically, the service provider server 10 performs operation of generating and sending a message related to a customer service. For example, when a customer or user applies for a credit card to a certain credit card company, the service provider server 10 being operated by the certain credit card company generates and sends a message related to a customer service to the customer or user who applies for the credit card.

The message related to the customer service may include various messages such as messages about shipping status according to application for a credit card, such as "The applied credit card was shipped", "Would you like any help during shipment of the credit card?", etc., messages related to additional/following-up services to be served subsequently or additionally, messages about options to request a customer or user's selection, and so on.

Specifically, the messages related to the customer services, which the service provider server 10 sends, may be classified into a beginning message and an additional/following-up service message. The beginning message refers to a message of which the service provider server 10 will first notify a customer or user. For example, when the customer or user applies for the credit card to the certain credit card company as described above, the message related to the application for the credit card, which the credit card company will send to the customer or user, corresponds to "The applied credit card was shipped."

After checking the beginning message that the credit card was shipped, the customer or user may want to receive various services to be served additionally and subsequently. In other words, the customer or user may want to receive additional and following-up services after being notified of the shipment of the credit card, such as, where is the credit card currently located? when is the credit card expected to arrive? whether is the credit card changeable? etc.

Thus, the service provider server 10 generates and sends not only the beginning message but also the message related to the services to be additionally and subsequently served to the customer or user, i.e. the additional/following-up service message. In other words, the service provider server 10 generates and sends the messages related to the customer services, which includes the beginning message and the additional/following-up service message.

The service provider server 10 does not all the messages related to the customer services including the beginning message and the additional/following-up service message to the user terminal 30, but sends only the beginning message having a small message size to the user terminal 30 and sends the additional/following-up service message having a relatively large message size to the intelligent proxy server 50. In this case, the service provider server 10 may send all the messages related to the customer services including the beginning message to the intelligent proxy server 50.

Specifically, the service provider server 10 generates the messages related to the customer services including the beginning message and the additional/following-up service message, and then first sends the additional/following-up service message to the intelligent proxy server 50. In this case, the service provider server 10 transmits user-identification information for identifying the user terminal 30 or a user (customer) together.

When the intelligent proxy server 50 receives the user-identification information and the additional/following-up service message, the additional/following-up service message is stored and managed corresponding to the user-identification information. The additional/following-up service message may include a single message, but generally include a plurality of messages because there are various services to be served additionally or subsequently. In this case, the intelligent proxy server 50 stores and manages the additional/following-up service messages including a plurality of messages, while considering association between the additional/following-up service messages. In this regard, descriptions will be made with reference to FIG. 2.

When the additional/following-up service messages together with the user-identification information are successfully sent to the intelligent proxy server 50, the service provider server 10 then sends the beginning message to the user terminal 30. Because the user terminal 30 cannot receive all the additional/following-up service messages, the user terminal 30 receives only the beginning message and then receives a desired additional/following-up message through communication with the intelligent proxy server 50, thereby receiving a desired additional or following-up service.

The user terminal 30, which received the beginning message from the service provider server 10, does not make the beginning message pop up so that a user can check the beginning message right away but makes the beginning message pop up only when the user is in a condition or situation to check the beginning message.

When the beginning message pops up on the user terminal 30, a user may click and select the beginning message to receive details of the beginning message or receive the additional and following-up service. Like this, when a user selects the beginning message, the user terminal 30 executes a provided interactive application program interface (API) and at the same time transmits its own user-identification information to the intelligent proxy server 50, and then performs automatic dialogue with the intelligent proxy server 50 through the interactive API in response to the user's selection or intelligently performs the automatic dialogue with the intelligent proxy server 50 through the interactive API by analyzing and considering collected information about the user's situation and background.

In brief, the user terminal 30 receives the beginning message from the service provider server 10, makes the beginning message pop up according to a user's situation information, and performs the automatic dialogue through the interactive API by taking the user's selection or the user's situation information and the user's background information into account when the message is sent from the intelligent proxy server 50 after the user selects the beginning message.

In more detail, the user terminal 30 receives the beginning message and performs operation of making the beginning message pop up only when it is identified based on previously collected information about the user's situation that a user can receive the beginning message.

Further, when the beginning message is selected by a user and then the message, i.e. the additional/following-up service message is sent from the intelligent proxy server 50, the user terminal 30 generates a user response message in response to the user's selection and sends the generated message through the executed interactive API in a case where options are given, but intelligently generates a user response message instead of the user through the interactive API by analyzing and considering previously collected information about the user's situation and background and sends the generated message through the executed interactive API in a case where general messages are given with no options.

Specifically, the user terminal 30 operating as described above is configured to include a user situation information collection unit 31, a user background information collection unit 33, and a user agent 35.

The user situation information collection unit 31 collects user setting information previously set by a user, and user situation information including sensing information obtained through sensors. The user setting information refers to information previously set by a user in relation to reception of a message, and may for example include "Messages currently undeliverable", "Messages undeliverable until 00", "Messages deliverable after 00", etc.

When a user selects "Messages currently undeliverable", the user situation information collection unit 31 collects the user setting information, and the user agent 35 reflects the user setting information and makes the beginning message not to pop up even though the beginning message is received from the service provider server 10.

Meanwhile, the user situation information includes not only the user setting information but also the sensing information obtained through various sensors provided in the user terminal or mounted to other devices connected to the user terminal. Specifically, the user situation information may include the sensing in formation collected from an acceleration sensor, an illumination sensor, a sound sensor, a timing sensor, etc.

When the sensing information is collected by the user situation information collection unit 31, the user agent 35 analyzes and considers the sensing information and makes the beginning message not to pop up when it is identified that a user is driving, asleep, or talking over the telephone, or it is late at night.

The user background information collection unit 33 collects message information generated while communicating with the intelligent proxy server 50 and user background information including service-related information generated while communicating with the service provider server 10.

Specifically, the user terminal 30 and the intelligent proxy server 50 exchange a message through communication, and the intelligent proxy server 50 stores and manages message information, which is generated while communicating with the user terminal 30 used by a certain user, by matching with the user-identification information.

Therefore, the user background information collection unit 33 may collect necessary information with reference to previous message information stored in the intelligent proxy server 50 as necessary. For example, when the intelligent proxy server 50 inquires about "Whether the credit card shipping address is changed or not" while the automatic dialogue is performed between the user terminal 30 and the intelligent proxy server 50 through the interactive API, the user background information collection unit 33 communicates with the intelligent proxy server 50 under control of the user agent 35, checks whether address change is present in the message information generated during the previous communication, and transmits a check result to the user agent 35. Then, the user agent 35 reflects result information, automatically generates a user response message (e.g. "The address was changed", "The changed address is 00", etc.), and transmits the generated user response message to the intelligent proxy server 50 through the executed interactive API.

Meanwhile, the user background information includes not only the message information generated during the communication with the intelligent proxy server 50, and information related to the service generated during the communication with the service provider server 10. For example, in a case where a purchase is made to a certain service provider through communication and then the purchase is canceled through communication with the service provider, when the intelligent proxy server 50 inquires about "Whether the purchase is canceled" while the user terminal 30 and the intelligent proxy server 50 perform the automatic dialogue through the interactive API, the user background information collection unit 33 communicates with the service provider server 10 under control of the user agent 35, checks whether the corresponding purchase cancelling is present in the service-related information generated during the previous communication, and transmits a check result to the user agent 35. Then, the user agent 35 reflects result information, automatically generates a user response message (e.g. "The purchase was changed", etc.), and transmits the generated user response message to the intelligent proxy server 50 through the executed interactive API.

The foregoing information collected in the user situation information collection unit 31 and the user background information collection unit 33 is analyzed and taken into account by the user agent 35 to determine whether to make the beginning message pop up or automatically generate and send the user response message to the intelligent proxy server 50 through the interactive API. Here, the user response message refers to a message with which the user terminal 30 replies or responds to the message sent from the intelligent proxy server 50.

The user agent 35 analyzes the user situation information to make the beginning message pop up only when it is determined that a user is in a condition to check the message, executes the interactive API when the user selects the beginning message, analyzes the user's selection or the user situation information and the user background information to generate the user response message to the message received from the intelligent proxy server 50, and transmits the generated user response message through the interactive API.

Specifically, the user agent 35 does not immediately make the beginning message pop up when the beginning message is received from the service provider server 10, but considers and analyzes information collected in the user situation information collection unit 31, i.e. the user setting and sensing information to control the beginning message not to pop up when it is determined that a user is asleep or unable to check the message but control the beginning message to pop up when it is determined that the user is in a condition to check the message.

When the beginning message pops up, a user may click and select the beginning message. Like this, when the beginning message is selected by a user, the user agent 35 executes the provided interactive API. As it will be described later, the interactive API may be an interactive API basically provided by the service provider, and an interactive API preferred or previously set by a user as necessary.

Thus, the user agent 35 executes the provided interactive API when the beginning message is selected, and at the same time transmits its own identification information, i.e. user-identification information to the intelligent proxy server 50 so as to perform the automatic dialogue with the intelligent proxy server 50 through the interactive API. Then, as it will be described later, the intelligent proxy server 50 transmits a top-level additional/following-up service message, i.e. a first additional/following-up service message among the additional/following-up service messages, which are being stored and managed corresponding the user-identification information, through the interactive API.

When the first additional/following-up service message is received from the intelligent proxy server 50, the user agent 35 interprets the message received from the intelligent proxy server 50, generates a user response message corresponding to an item selected by a user in response to a user's selection when options are given in the received message, and transmits the user response message through the executed interactive API. For example, the received message includes an option "Please choose one. 1) cancel the purchase, 2) change the purchase, 3) confirm the purchase", a user may choose one of them by clicking. When the user chooses "Cancel the purchase", the user agent generates and sends a user response message "The purchase is canceled" corresponding to the choice.

On the other hand, when a general message with no options is received, the foregoing user situation and background information is analyzed to generate a user response message with regard to the received message and then transmitted through the executed interactive API. The intelligent user response message is automatically generated by analyzing and considering the background information generated during the communication with the service provider server 10 and the intelligent proxy server 50 as described above, and transmitted through the executed interactive API.

Meanwhile, the user agent 35 may generate a user response message to a general received message by taking not only the user background information but also the user situation information into account. For example, a user may make the user setting information be previously stored and recorded, and a message "Cancel the purchase", "Cancel the application for the credit card", etc. may be set to be generated as the user response message when a message is received from a certain merchandise service provider or a certain credit card service provider. Specifically, when a user records the user setting information of "00 credit card company, cancel the application for the credit card" in a storage space for the user setting information, the user situation information collection unit 31 collects the recorded user setting information, and the user agent 35 may generate and transmit a user response message "Cancel the application for the credit card" when a general message related to the 00 credit card company is received from the intelligent proxy server 50 and it is determined that the received message is the service message related to the application for the credit card.

The intelligent proxy server 50, which communicates with the user terminal 30 to perform the automatic dialogue, automatically transmit and receive the messages related to the customer services to and from the user terminal 30, instead of the service provider server 10. In other words, the intelligent proxy server 50 acts on behalf of the service provider server 10 to communicate with the user terminal 30 and process the messages related to the customer services through the interactive API.

Therefore, a proxy service provider for managing the intelligent proxy server 50 previously makes a contract for a proxy for an intelligent message-processing service with the service provider and goes through a process. The intelligent proxy server 50 enters into an agreement with the service provider providing many diverse services to act as a proxy for processing the messages related to the customer services, and acts to process the messages related to the customer services for the user instead of the certain service provider when the service provider server 10 managed by the certain service provider makes an ask to process the messages related to the customer services along with the user-identification information about the corresponding customer.

The service provider server 10 managed by the service provider makes a request for a proxy for automatically processing a message while transmitting an additional/following-up service message along with user-identification information of a certain customer to the intelligent proxy server 50 as described above, so that the service provider that conclude an agreement with the proxy server provider can automatically process the messages related to the customer services for a certain customer (user).

When the request for the proxy for automatically processing the message is successfully made to the intelligent proxy server 50, that is, when the additional/following-up service message is successfully transmitted, the service provider server 10 sends a beginning message corresponding to a message related to the customer service to the user terminal 30 as described above. Then, the user terminal 30 may make the beginning message pop up by operation as described above, and a user may select the beginning message by clicking.

When a user selects the beginning message, the user-identification information is sent to the intelligent proxy server 50 as described above. Then, the intelligent proxy server 50 recognizes the user-identification information, extracts the additional/following-up message to be sent based on the additional/following-up service message stored and managed corresponding to the user-identification information, and sends the extracted additional/following-up message to be displayed through the interactive API executed in the user terminal 30, thereby carrying out automatic dialogue with the user terminal 30.

In brief, the intelligent proxy server 50 communicates with the user terminal 30 to act as a proxy for processing the messages related to the customer services instead of the service provider server 10 through the interactive API, receives an additional/following-up service message about the user from the service provider server 10, and performs operation of automatic dialogue with the user terminal 30 through the interactive API by taking the additional/following-up service message into account when a user selects the beginning message.

MODES FOR CARRYING OUT THE INVENTION

The features of the foregoing intelligent message processing system 100 according to an embodiment of the disclosure will be described in more detail as follows.

The intelligent proxy server 50 receives a message related to matters to be additionally or subsequently guided or served from the service provider server 10 to a user, i.e. an additional/following-up service message, among the messages related to the customer services from the service provider server 10, and stores and manages the received message by matching with user-identification information about a customer received together.

Figure 2:
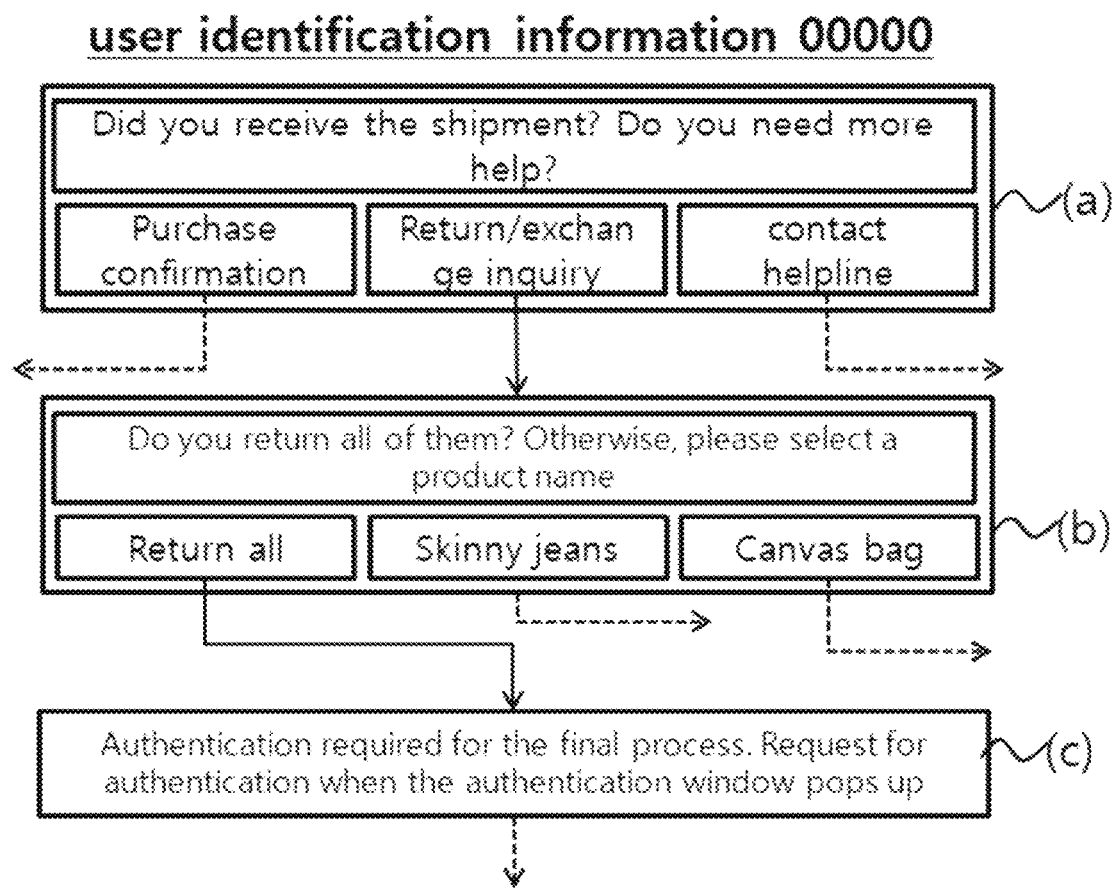
FIG. 2 illustrates an additional/following-up service message applied to an intelligent message processing system according to an embodiment of the disclosure.
Figure 3:
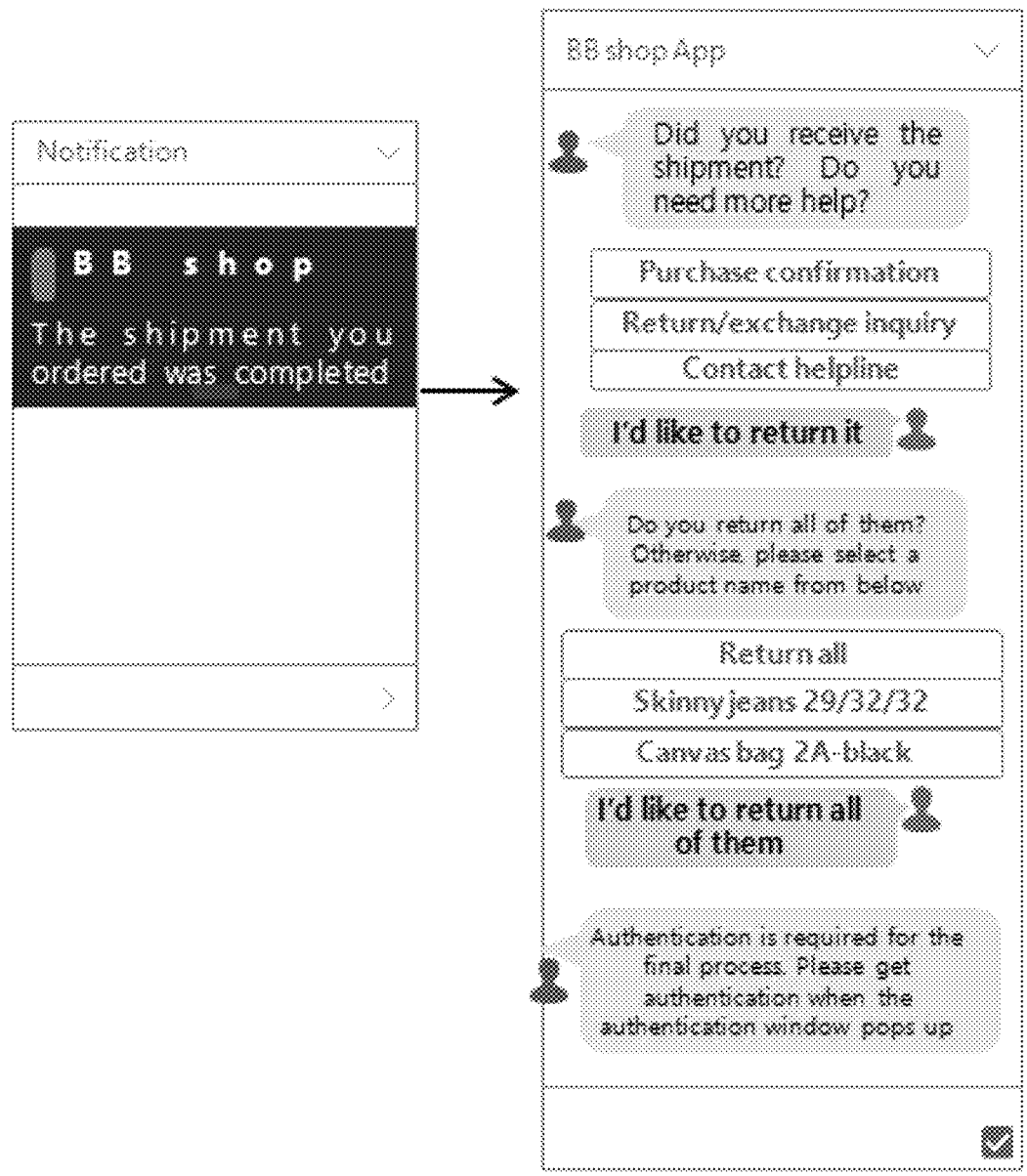
FIG. 3 illustrates a first example of processing a message in an intelligent message processing system according to an embodiment of the disclosure.

The additional/following-up service message stored and managed by the intelligent proxy server 50 matches with the user-identification information as shown in FIG. 2, and the additional/following-up service messages are stored and managed as associated with one another. For example, the additional/following-up service messages include a plurality of additional/following-up service messages associated with one another in service procedure order (FIG. 3 illustrates three additional/following-up service messages), and stored and managed matching with the user terminal 30 corresponding to the user-identification information of "00000".

The intelligent proxy server 50 storing and managing the additional/following-up service message by matching with the user-identification information first sends the top-level additional/following-up service message, i.e. the first additional/following-up service message (see "(a)" in FIG. 2) among the additional/following-up service messages stored and managed matching with the user-identification information to the user terminal 30 when the user-identification information is received from the user terminal 30 (when the user-identification information is received as a user selects the popped-up beginning message), thereby controlling the top-level additional/following-up service message to be displayed on the interactive API.

The first additional/following-up service message (a) refers to a message corresponding to a service or option, which will be first guided and served when a service providing order is taken into account, among services to be additionally or subsequently provided by the service provider to a user who applies for the service.

In brief, when user-identification information is received from the user terminal 30, the intelligent proxy server 50 first sends the first additional/following-up service message (a) among the additional/following-up service messages stored and managed matching with the user-identification information to the user terminal 30, so that the first additional/following-up service message (a) can be displayed on the executed interactive API.

To described details in this regard, it will be assumed that a user of the user terminal 30 has previously made a purchase in a BB shop and the service provider server 10 managed by the BB shop provides an additional and following-up guide or service to the user.

To this end, when the service provider server 10 successfully transmits the additional/following-up service message shown in FIG. 2 to the intelligent proxy server 50, the beginning message is immediately sent to the user terminal 30. In this case, the user agent 35 of the user terminal 30 does not make the beginning message right away as described above, but takes various pieces of information (situation information, etc.) into account, thereby making the beginning message pop up only when the user is in a situation to check the beginning message.

When it is determined that the user is in a condition to check the beginning message, the user agent 35 makes the beginning message pop up as shown in the left window of FIG. 3. Specifically, the beginning message is popped up as a simple beginning message "The shipment you ordered was completed."

The user who checked the beginning message may click and select the beginning message to receive more detailed shipping information or an additional service. Then, the user agent 35 executes the provided interactive API to display a dialogue screen as shown in the right window of FIG. 3. The interactive API may be an interactive API given by the service provider, i.e. the BB shop, or another interactive API set or preferred by a user as necessary. In this regard, descriptions will be made later.

When the beginning message is selected by a user, the interactive API is executed and at the same time the user-identification information is transmitted to the intelligent proxy server 50. Then, the intelligent proxy server 50 receives the user-identification information, and controls the first additional/following-up service message among the additional/following-up service messages stored and managed corresponding to the user-identification information to be displayed on the interactive API.

Because the first additional/following-up service message (a) illustrated in FIG. 2 include a message "Did you receive the shipment? Do you need more help?" and options "Purchase confirmation", "Return/exchange inquiry" and "Contact helpline", the first additional/following-up service message (a) is displayed at the top of the dialogue screen on the interactive API as shown in FIG. 3 when the intelligent proxy server 50 transmits the first additional/following-up service message.

Thus, the additional/following-up service message with the options are displayed on the dialogue screen of the interactive API. In this case, a user who checked the additional/following-up service message may click and select one of the options. Then, the user agent 35 of the user terminal 30 generates a user response message corresponding to a selected option in response to the user's selection and displays the user response message on the dialogue screen of the interactive API.

Referring to FIG. 3, the user selects "Return/exchange inquiry" among three options involved in the first additional/following-up service message, and the user agent 35 automatically generates a user response message "I'd like to return it" as a message corresponding to the option "Return/exchange inquiry" and displays the user response message on the dialogue screen. The user agent 35 may generate and display a message previously stored matching with the selected option by figuring out the selected option, or may generate and display the user response message by autonomously processing the content of the selected option.

In other words, the user agent may be configured to employ a matching database previously stored and managed, and further use learning to figure out the content of the message, thereby generating a proper user response message. Such a configuration may be achieved based on various machine learning techniques, language processing techniques, artificial intelligence techniques, etc.

Meanwhile, the user agent 35 generates the user response message when a user selects one among the options, but may generate and display a user response message regardless of a user's selection as necessary. In other words, the user agent 35 may generate and display the user response message based on the user situation information and the user background information regardless of the user's selection.

Specifically, the user may previously store the user setting information of "BB shop, return" in a user setting-information storage space. The user setting information may be collected by the user situation information collection unit 31. Alternatively, when the user makes a purchase and then applies for return to the BB shop, the user background information collection unit 33 may collect information about the user's "Request for return" based on service-related information generated during communication with the BB shop, i.e. the service provider server 10.

In such circumstances, the user agent 35 may figure out that the user wants to make a request for return based on the situation information and the background information even though the user does not select a certain option after receiving the additional/following-up service message with the options, and therefore generate and display a relevant user response message "I'd like to return it" on the dialogue screen.

In this manner, the user response message is displayed on the dialogue screen as shown in FIG. 3 when the user agent 35 of the user terminal 30 sends the user response message to the interactive API. FIG. 3 illustrates that "I'd like to return it" is displayed as the user response message sent from the user terminal 30.

The intelligent proxy server 50, which received the user response message from the user terminal 30, extracts the next additional/following-up service message associated with the user response message, i.e. a second additional/following-up service message associated with the user response message, from the stored and managed additional/following-up service messages, and generates the second additional/following-up service message as a server response message, thereby displaying the server response message on the dialogue screen of the interactive API.

For example, as shown in FIG. 2, a second additional/following-up service message (b) is stored and managed as corresponding to and associated with each option of the first additional/following-up service message (a). Specifically, FIG. 2 illustrates that the second additional/following-up service message (b) corresponding to the option "Return/exchange inquiry" is stored and managed including a message "Do you return all of them? Otherwise, please select a product name" and options 1) "Return all", 2) "Skinny jeans", and 3) "Canvas bag".

Among the options involved in the first additional/following-up service message (a), the message related to "Return/exchange inquiry" was sent as the user response message. In other words, the intelligent proxy server 50 received the user response message related to "Return/exchange inquiry". Therefore, the intelligent proxy server 50 extracts the second additional/following-up service message corresponding to the message associated with the received user response message (the message related to the return/exchange inquiry) as the server response message to be displayed on the dialogue screen of the interactive API.

In this regard, FIG. 3 illustrates that the intelligent proxy server 50 displays the server response message with the message "Do you return all of them? Otherwise, please select a product name from below" and the options 1) "Return all", 2) "Skinny jeans", and 3) "Canvas bag".

Thus, the user agent 35 of the user terminal 30 generates and transmits the user response message in response to the user's selection or in consideration of the user situation information and the user background information as described above.

FIG. 3 illustrates that the user agent 35 generates and transmits a user response message "I'd like to return all of them" corresponding to the whole return when the user selects the whole return or based on the user situation information and the user background information without the user's selection.

When the intelligent proxy server 50 receives the user response message about the return, the next additional/ following-up service message, i.e. an additional/following-up service message associated with the user response message (the message about the whole return) among third additional/following-up service messages is extracted as the server response message and displayed on the dialogue screen of the interactive API.

FIG. 2 illustrates that the third additional/following-up service message associated with the user response message related to the whole return is stored and managed as "Authentication required for the final process. Request for authentication when the authentication window pops up". Therefore, as shown in FIG. 3, the intelligent proxy server 50 controls the server response message "Authentication is required for the final process. Please get authentication when the authentication window pops up" to be generated as the additional/following-up service message associated with the return in response to the user response message "I'd like to return all of them" related to the return and displayed on the dialogue screen of the interactive API.

As described above, the intelligent proxy server 50 receives the user response message, and controls the additional/following-up service message associated with the user response message among the additional/following-up service messages to be generated as the server response message and displayed on the dialogue screen of the interactive API.

Specifically, the intelligent proxy server 50 controls the top-level additional/following-up service message (the first additional/following-up service message) to be displayable on the interactive API executed in the user terminal when the user-identification information is received as the user terminal 30 first selects the beginning message, and then controls the server response message to be generated by extracting the additional/following-up service message associated with the user response message among the stored and managed additional/following-up service messages and displayed on the interactive API executed in the user terminal when the user response message is received from the user terminal.

Meanwhile, the additional/following-up service message transmitted from the intelligent proxy server 50 to the user terminal 30 may be sent involving options or may be sent as a general message without options. In the former case, as described above, the user agent 35 generates and transmits the user response message in response to a user's selection or based on the user situation information and the user background information.

In the latter case, the user agent 35 generates and transmits the user response message based on the user situation information and the user background information without considering the user's selection because the options are not involved. The method of generating the user response message based on the user situation information and the user background information is equivalent to the method described as above.

Figure 4:
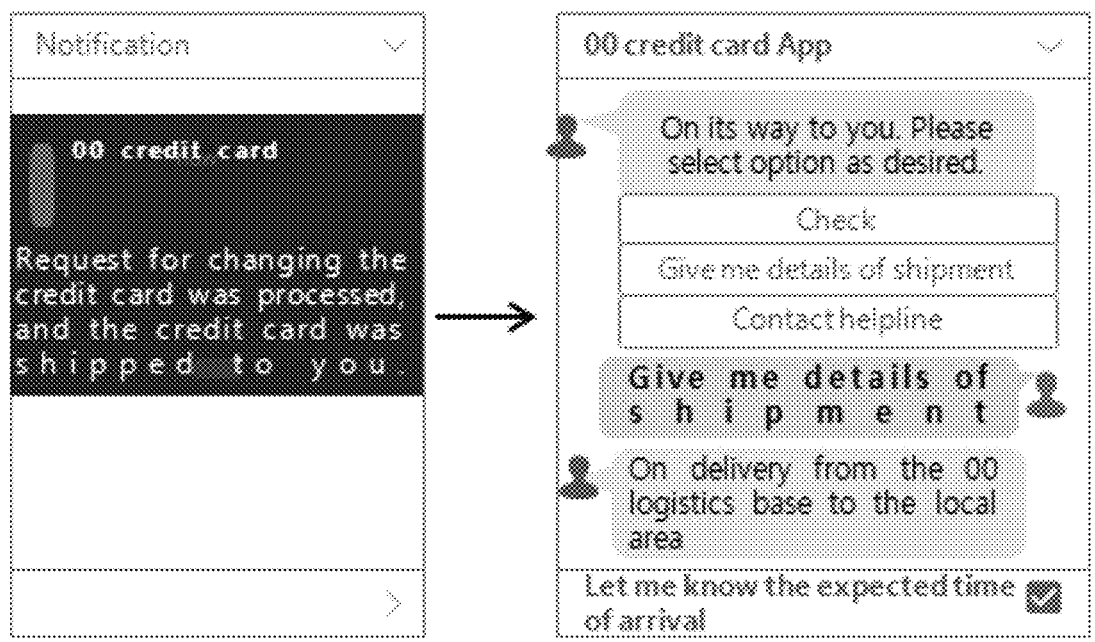
FIG. 4 illustrates a second example of processing a message in an intelligent message processing system according to an embodiment of the disclosure.

FIG. 4 illustrates that the user agent 35 generates and transmits the user response message based on the user situation information and the user background information when the user terminal 30 receives the general message involving no options as the additional/following-up service message from the intelligent proxy server 50. In other words, referring to FIG. 4, when the intelligent proxy server 50 sends the server response message as the additional/following-up service message "On delivery from the 00 logistics base to the local area", the user agent of the user terminal recognizes the server response message, and generates and transmits a user response message "Let me know the expected time of arrival" based on the user situation information, in particular, the user setting information and (or) the user background information in response to the server response message. More specifically, a user may previously store information "the 00 credit card, make sure to check the expected time of arrival" in the user setting information, and the user agent takes this user setting information into account to automatically generate and transmit the user response message "Let me know the expected time of arrival".

Meanwhile, the foregoing user terminal 30 and the intelligent proxy server 50 can automatically exchange the messages related to the customer services through the interactive API as described above. The interactive API may be provided and installed in the user terminal 30, and the user terminal 30 may generally be installed and provided with a dedicated interactive messenger API distributed, managed and provided by the service provider. Of course, the user may install an open-type API support messenger s/he likes, such as Kakao Talk, Facebook, etc. as well as the dedicated interactive messenger API distributed, managed and provided by the service provider.

Therefore, the interactive API executed and usable by the user terminal 30 may include a dedicated interactive messenger API provided by the service provider or an open-type API support messenger.

First, the user terminal 30 may be installed and provided with the dedicated interactive messenger API basically distributed, managed and provided by the service provider, and execute the dedicated interactive messenger API to automatically exchange messages related to customer services with the intelligent proxy server 50. In this case, the intelligent proxy server 50 may communicate with the user terminal and directly control the dedicated interactive messenger API. Therefore, the intelligent proxy server 50 may directly display the first additional/following-up service message on the dedicated interactive messenger API executed in the user terminal 30 when receiving the user-identification information as the user selects the beginning message. Thus, the user terminal generates and transmits a user response message by the foregoing method.

Meanwhile, a user may exchange the messages related to the customer services with the intelligent proxy server 50 acting as a proxy for the service provider server 10 through his/her main favorite open-type API support messenger instead of the dedicated interactive messenger API To this end, the user agent determines whether the user intends to use a specific open-type API support messenger to exchange the messages related to the customer services based on the user situation information and (or) the user background information. Specifically, the user may previously set a command as the user setting information to transmit and receive the messages related to the customer services through a specific open-type API support messenger such as "Kakao Talk," etc. Further, when the user has used only a specific open-type API support messenger to exchange the messages related to the customer services with the intelligent proxy server 50, message information generated during this communication is stored and managed in the intelligent proxy server, and the user background information collection unit 33 collects information that the user has preferred and used the specific open-type API support messenger based on the information stored and managed in the intelligent proxy server 50.

In this case, the user agent determines that the user has preferred and used the specific open-type API support messenger in transmitting and receiving the messages related to the customer services, based on the user situation information, in particular, the user setting information and (or) the user background information.

Under this determination, when the user selects the beginning message, the user agent 35 executes the specific open-type API support messenger and at the same time transmits information about the kind of open-type API support messenger preferred and used by the user and the user's account in addition to the user-identification information to the intelligent proxy server. In other words, the user agent 35 transmits the user-identification information, and information about the kind of specific open-type API support messengers such as Kakao Talk, Facebook, etc. (i.e. a messenger name) and user accounts.

However, on the contrary to the dedicated interactive messenger API, the specific open-type API support messenger cannot be directly controlled by the intelligent proxy server 50. Therefore, even though the specific open-type API support messenger is executed in the user terminal, only the dialogue screen pops up and it is impossible to directly display the additional/following-up service message. In other words, like Kakao Talk, etc., the specific open-type API support messenger comes to a state capable of exchanging the messages when a user first sends a message.

Therefore, the intelligent proxy server 50 first generates and transmits a message for requesting the additional/following-up service message through the user account of the specific open-type API support messenger, e.g. the user account of Kakao Talk, Facebook, etc. when receiving the user-identification information, the information about the kind of specific open-type API support messenger, and the information about the user account from the user terminal. The request message may include specific content, or may simply include a message for requesting the additional/following-up service, for example, "What kind of help can I get after shipment begins?" or "Request for message to be sent to me".

At this time, the message for requesting the additional/following-up service message transmitted through the user account of the specific open-type API support messenger refers to a message to be sent to Kakao Talk, Facebook, etc. by the intelligent proxy server 50 instead of the user, and is generally not displayed on the dialogue screen of the specific open-type API support messenger such as Kakao Talk, Facebook, etc. executed and displayed in the user terminal 30. However, it is determined based on a user's selection or policy of the specific open-type API support messenger whether to display the dialogue screen of the specific open-type API support messenger such as Kakao Talk, Facebook, etc. executed and displayed in the user terminal 30.

When the message for requesting the additional/following-up service message is transmitted through the user account of the specific open-type API support messenger, the intelligent proxy server 50 sends the top-level additional/following-up service message (the first additional/following-up service message) among the additional/following-up service messages to the user account of the open-type API support messenger in reply to the message for requesting the additional/following-up service message.

Then, the first additional/following-up service message is sent to the user account of the open-type API support messenger such as Kakao Talk, Facebook, etc., and is therefore naturally displayable on the dialogue screen of the open-type API support messenger executed in the user terminal.

Thereafter, as described above, the user terminal generates a user response message with regard to the additional/following-up service message and transmits the user response message through the open-type API support messenger. Then, the intelligent proxy server 50 receives the user response message, and generates the additional/following-up service message as the server response message in response to the user response message, thereby transmitting the additional/following-up service message to the user terminal through the open-type API support messenger.

Although a few exemplary embodiments of the disclosure have been shown and described, these are for illustrative purpose only and it will be appreciated by a person having an ordinary skill in the art that various changes and equivalents can be made from these embodiments. Therefore, the true technical protection scope of the disclosure should be defined in the appended claims.

INDUSTRIAL APPLICABILITY

An intelligent message processing system according to the disclosure does not require a user to take follow-up measures related to provision of service in person every time in terms of sending and receiving messages related to customer services between various service providers and many customers, and thus improves convenience for the users and the service providers while the messages related to the customer services are more likely to arrive.

The invention claimed is:
1. An intelligent message processing system consisting of:
a service provider server configured to generate and send a message related to a customer service;
a user terminal configured to
receive a beginning message from the service provider server,
make the beginning message pop up based on user situation information, and
perform a first automatic dialogue through an interactive application program interface (API) based on a user's selection or the user situation information and user background information after a user selects the beginning message; and
an intelligent proxy server configured to
act as a proxy for processing the message related to the customer service instead of the service provider server through the interactive API by communicating with the user terminal,
receive an additional/following-up service message about the user from the service provider server, and
perform a second automatic dialogue with the user terminal through the interactive API based on the additional/following-up service message,
wherein the interactive API comprises a messenger API provided by a service provider or an open-type API support messenger,
wherein the user terminal comprises:
a user situation information collection unit configured to collect user situation information that comprises user setting information previously set by the user and sensing information obtained through sensors;
a user background information collection unit configures to collect user background information that comprises message information generated during communication with the intelligent proxy server and service-related information generated during communication with the service provider server; and
a user agent configured to
analyze the user situation information, make the beginning message pop up only when the user is in a condition to check a message, execute the interactive API after the user selects the beginning message, and generate a user response message with regard to a message received from the intelligent proxy server by analyzing the selection of the user or the user situation information and the user background information, wherein the intelligent proxy server, instead of the service provider server, generates an additional/following-up service message associated with the user response message as a server response message when the user response message is received.

* * * * *